F. HELLER.
SPREADING OVEN FOR THE MANUFACTURE OF SHEET GLASS.
APPLICATION FILED FEB. 24, 1914.

1,120,486.

Patented Dec. 8, 1914.
5 SHEETS—SHEET 1.

Witnesses
E. Leckert
M. J. L. Higgins

Inventor
Fritz Heller.
By Henry Orth atty

F. HELLER.
SPREADING OVEN FOR THE MANUFACTURE OF SHEET GLASS.
APPLICATION FILED FEB. 24, 1914.

1,120,486.

Patented Dec. 8, 1914.
5 SHEETS—SHEET 3.

Witnesses
Inventor
Fritz Heller

Fig. 13

F. HELLER.
SPREADING OVEN FOR THE MANUFACTURE OF SHEET GLASS.
APPLICATION FILED FEB. 24, 1914.

1,120,486.

Patented Dec. 8, 1914.
5 SHEETS—SHEET 5.

UNITED STATES PATENT OFFICE.

FRITZ HELLER, OF KASNIAU, NEAR PILSEN, AUSTRIA-HUNGARY.

SPREADING-OVEN FOR THE MANUFACTURE OF SHEET-GLASS.

1,120,486.　　Specification of Letters Patent.　　Patented Dec. 8, 1914.

Application filed February 24, 1914. Serial No. 820,631.

*To all whom it may concern:*

Be it known that I, FRITZ HELLER, subject of the Emperor of Austria-Hungary, residing at Kasniau, near Pilsen, Bohemia, Austria-Hungary, have invented certain new and useful Improvements in or Relating to Spreading-Ovens for the Manufacture of Sheet-Glass; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

In the well known spreading oven for the manufacture of sheet glass, the spreading trucks and the traverser must be introduced in given sequence into the various compartments of the oven. The driving of the trucks and of the traverser is effected either by hand or by means of a motor. In the latter case, it is necessary, for the purpose of obtaining the movement desired at the time, to switch the driving motor several times or to operate change-over devices in the power transmission gear. The sheets of glass trimmed in the trimming compartment of the spreading oven, are pushed into the cooling canal or tunnel adjoining the said compartment, in which they are intermittently conveyed to the end of the cooling tunnel by a movable grid-conveyer. The movements required for conveying the sheets of glass were hitherto given to the grid by hand. The cooled sheets reaching the end of the tunnel, were lifted off by hand from the grid and conveyed on a truck, the so-called sheet truck. Operation of the switches of the driving motor and of the change-over devices of the driving gear, operation of the grid-conveyer by hand, removing the cooled sheets of glass from the grid and laying the same on the truck, require considerable time and trouble. The flatteners must constantly stop their flattening work proper, so that the spreading oven itself and the fuel used, cannot be utilized to the fullest extent.

This invention relates to a spreading oven with electric driving of the spreading trucks and of the traverser, which is provided with devices for simplifying the manipulation of the motor switches and of the change-over devices of the driving gear, and for automatic operation of the grid-conveyer, as well as with a device for automatically lifting off and laying on the cooled sheets of glass. The grid-conveyer is in this case driven by the traverser reciprocating in the changing compartment, and the lifting off and laying-on device provided at the end of the cooling tunnel, is also operated from the traverser through the intermediary of the grid-conveyer. Any movement of the trucks and of the traverser is transmitted, by means of a suitable gear, to a switch gear for the driving motor and for the electrically operated change-over devices of the driving gear, so that, as soon as the movement of the spreading trucks or of the traverser is completed, the motor is stopped, and the switch gear itself, as well as the change-over devices of the driving gear are brought into a position ready for the next movement of the trucks or of the traverser, so that, by a simple rotation of the switch gear, always taking place in the same direction, the said gear can be brought from the preparatory position into the position producing the next movement of the trucks or of the traverser, of the grid-conveyer and of the lifting off and laying-on device.

The accompanying drawings show by way of example, a construction according to this invention, Figures 1 to 4 showing diagrammatically the consecutive movements of the spreading trucks and of the traverser. Fig. 5 shows the driving gear for the spreading trucks and the traverser.

The traverser 1 is reciprocated in the direction of the arrows II and IV (Figs. 2, 4, 6 and 13) in the changing compartment 2 of the oven, and is provided with two tracks 5, 6 on the same level as the tracks 7 or 8 arranged in the flattening compartment 3 and in the trimming compartment 4. The trucks A, B, C are reciprocated in the direction of the arrows I and III (Figs. 1 and 3), the truck in the spreading or flattening compartment 3 or in the trimming compartment 4 being coupled to the truck standing in line with the tracks 7, 8 on the traverser 1. The four movements (of the trucks and of the traverser) follow in the well known manner in the sequence indicated by the arrows I, II, III, IV (Figs. 1 to 4). During the movements I and III, the drive of the traverser 1 must be thrown out of gear, and during the movements II and IV, the drive of the trucks A, B, C. Moreover, during the movements I and III, as well as during the movements II and IV, the driving must take place alternately in opposite directions. When the whole driving is to be effected by a single motor, it is therefore necessary to change alternately the direction of rotation of the motor, as well as to transmit the movement alternately to the trucks and to the traverser, that is to say, repeatedly to switch over and to change over the driving gear.

Devices shown in Figs. 5 to 14 are intended to simplify the attendance of the spreading oven.

Figure 6:
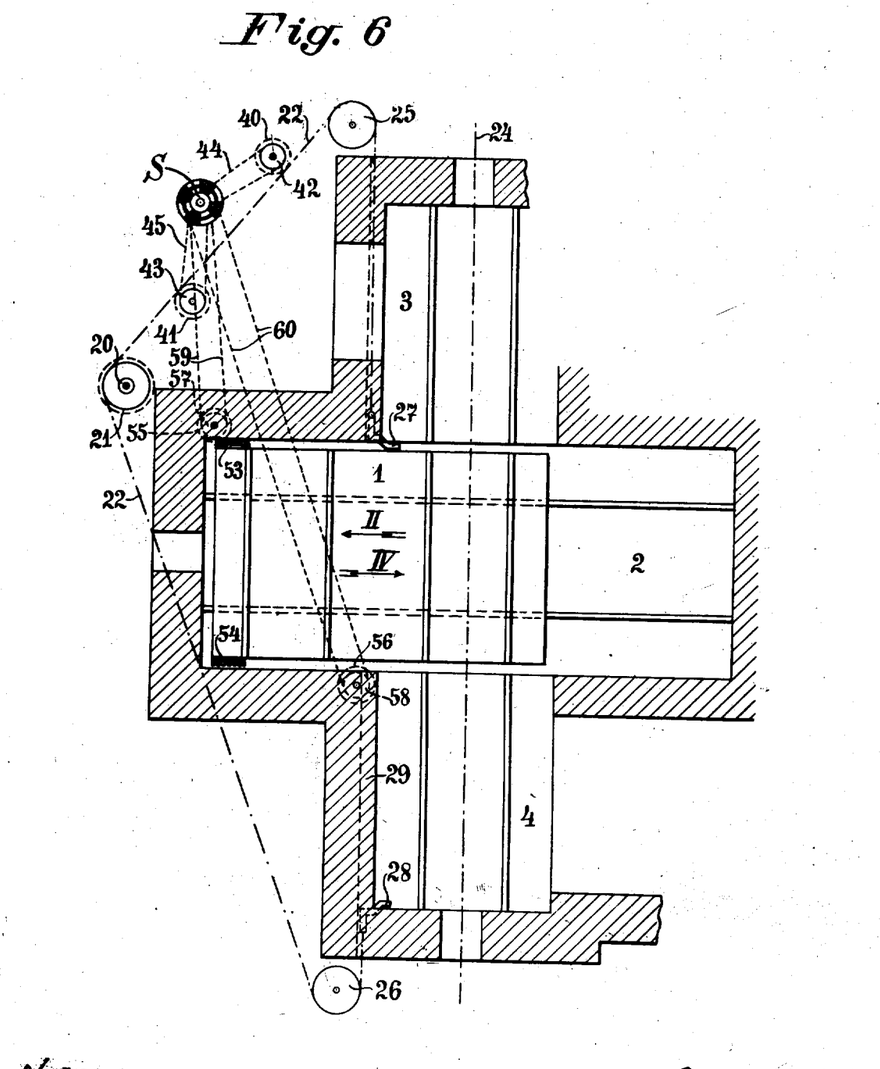
Fig. 6 shows the head of the spreading oven in plan.

For driving all the movable parts of the spreading oven, is used an electric motor 9 (Fig. 5), the spindle of which is provided with a worm thread engaging with a worm wheel 10. On the spindle 11 of the said worm wheel is mounted a toothed wheel 12 engaging with a toothed wheel 13 mounted loose on the joint of two spindles 14, 15 and carrying at both sides electrically operated clutches 16, 17, by means of which the spindles 14, 15 can be driven independently of each other. The spindle 14 drives, by means of bevel wheels 18, 19, a vertical spindle 20 (Figs. 5 and 6) driving the trucks A, B, C by means of a chain wheel 21 and a chain 22 (Fig. 6). The spindle 15 drives the traverser 1 by means of a chain wheel 23 (Fig. 5) and an endless chain 24 passing over rollers (not shown in the drawing).

To the ends of the chain 22 for driving the trucks, guided by rollers 25, 26 (Fig. 6), are secured drivers or cams 27, 28 adjustable in guides 29 (Figs. 10 and 11) provided in the lateral walls of the flattening compartment 3 and of the trimming compartment 4. The drivers 27, 28 are used for pulling the trucks in the direction of the arrows I and III. The two trucks (A, B or B, C in Figs. 1-3) to be moved in these directions, are simultaneously pulled, being coupled together for the purpose. The coupling and uncoupling of two trucks is effected automatically during the movement of the traverser 1 in the direction of the arrows II and IV. One end of each truck is provided for the purpose with a coupling head 30 (Fig. 12), and the other end with a horizontal coupling bar 31 open at both ends; when the traverser 1 with the trucks standing on the same, is moved, the coupling head 30 of the truck situated in the spreading or flattening compartment 3 or in the trimming compartment 4, is brought into, or out of, engagement with the said coupling bar. Each truck is moreover provided at each end with a coupling bar 32 (Fig. 12) open at the top, with which the drivers 27, 28 engage from the top. When the spreading trucks A, B are moved in the direction of the arrow I (Fig. 1), the driver 28 engages with the coupling bar 32 of the truck B, and the driver 27 with the coupling bar of the truck A. If the chain 22 is moved in the direction of the arrow I, the driver 28 pulls forward the two trucks A, B, the truck A pulling with it the driver 27. During the movement of the traverser 1, now taking place in the direction of the arrow II, the driver 27 is disengaged from the coupling bar 32 of the truck A, and engages with the bar of the truck C, so that, at the next movement of the trucks B, C in the direction of the arrow III, the driver 27 becomes operative and pulls back the said trucks B, C.

Figure 1:
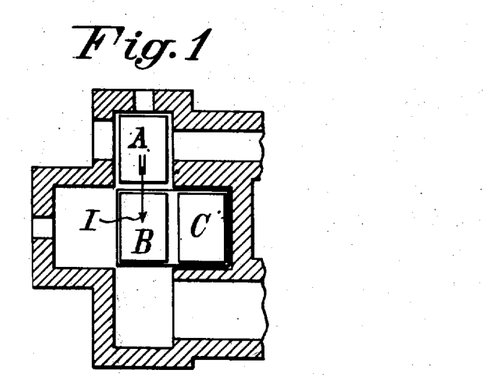
Figure 2:
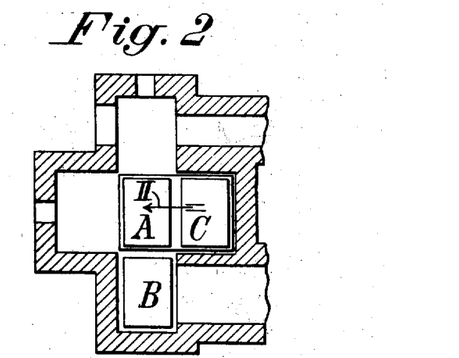
Figures 3, 4, 5:
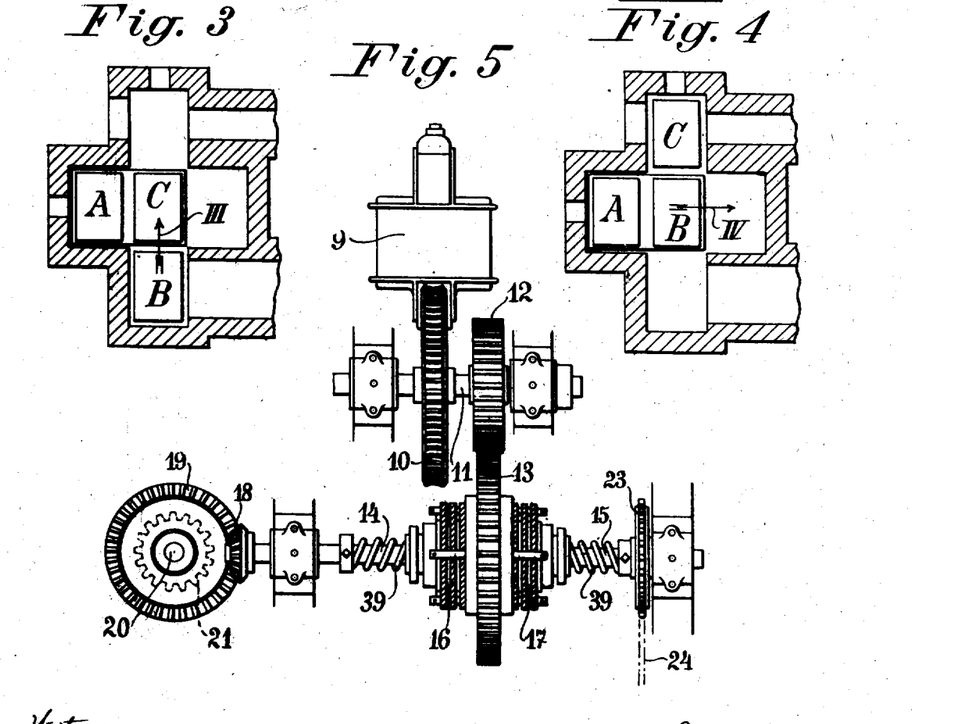
Figures 7, 8, 9, 10, 11:
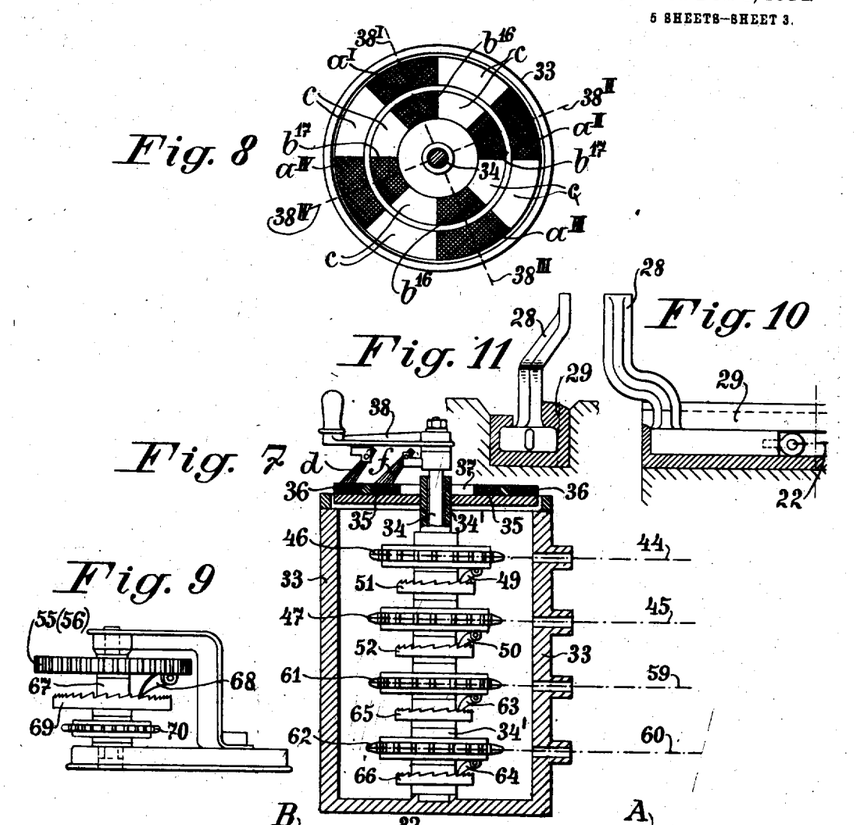
Figs. 7 and 8 show, respectively in section and in plan, the switch gear controlling the driving motor and the change-over devices of the driving gear.
Figs. 9 to 12 show details of the spreading oven.
Figure 12:
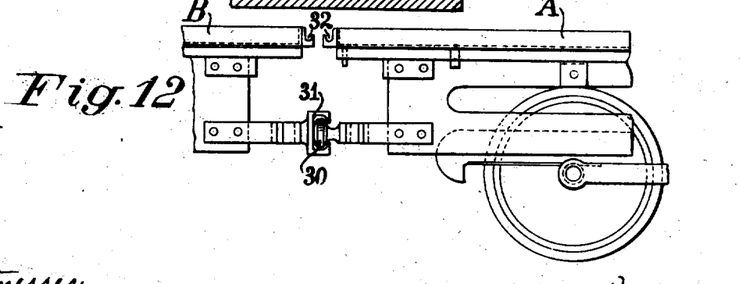

The direction of rotation of the motor 9 (Fig. 5) must be changed after each of the movements I—IV. During the movements I and III, the clutch 16 must be in gear, and the clutch 17 out of gear. During the movements II and IV, the clutch 17 must be in gear, and the clutch 16 out of gear. The switching of the motor 9 and the changing of the clutches 16, 17, required for each movement, are obtained, according to this invention, by means of a single switch gear S (Fig. 6) controlled by the trucks A, B, C and the traverser 1, or by their driving parts, and arranged near the stand of the flattener. The switch gear S is shown on an enlarged scale in Figs. 7 and 8 and consists of a casing 33 in which is rotatably mounted a hollow spindle 34'. To the upper end of the hollow spindle 34' is secured a switch disk 37 carrying two concentric contact rings 35, 36 (Fig. 7). Each of the two contact rings 35, 36 consists of four metal sections $a^I$, $a^{II}$, $a^{III}$, $a^{IV}$, or $b^{16}$, $b^{17}$ (Fig. 8), separated from each other by insulating sections $c$. In the hollow spindle 34' is mounted a spindle 34 to which is secured a crank or handle 38 (Fig. 7) carrying two sliding brushes $d$, $f$, the brush $d$ being intended for the outer, and the brush $f$ for the inner contact rings 35, 36. To the contacts $a^I$—$a^{IV}$ and to the contact brush $d$ are connected the current supply wires for the motor 9 which, when the brush $d$ is on the contacts $a^I$ and $a^{II}$, rotates in one direction, and when the brush $d$ is on the contacts $a^{III}$ and $a^{IV}$, in the opposite direction. To the two contacts $b^{16}$ are connected conductor wires leading to the clutch 16, and to the contacts $b^{17}$, conductors leading to the clutch 17. When the handle 38 of the switch gear S is in the position $38^{I}$ illustrated in Fig. 8, the motor 9 rotates in the direction corresponding to the direction of movement I of the trucks (Fig. 1); on the contrary, when the handle is in the position $38^{III}$, the motor rotates in the direction corresponding to the direction III, that is to say, in the opposite direction. In both cases, the clutch 16 is in gear, and the clutch 17 out of gear. If the handle is in the position $38^{II}$ and $38^{IV}$, the clutch 17 is in gear, and the clutch 16 out of gear, so that only the traverser 1 is driven, namely, as with the handle in the position $38^{IV}$, the motor 9 rotates in the direction opposite to that when the handle is in the position $38^{II}$, once in the direction of the arrow II, and then in the direction of the arrow IV (Figs. 2 and 4). When the handle 38 is above the insulating sectors $c$ (Fig. 8), both clutches 16, 17 are out of gear, and the motor 9 is standing still. For throwing the clutches out of gear after the current has been cut off, are used springs 39 (Fig. 5). By means of the switch gear described, all the movements I—IV can therefore be obtained in the proper sequence by simply turning the handle 38 in the direction of the arrow in Fig. 8.

The motor 9 must be stopped at the moment when the trucks or the traverser reach their end positions. The stopping of the motor at the proper moment can be effected automatically, by the movements of the trucks and of the traverser 1 being transmitted to the hollow spindle 34' supporting the contacts $a^{I}-a^{IV}$ and $b^{16}$, $b^{17}$, so that, after each completed movement I—IV, the said contacts are pulled off from the stationary sliding brushes $d$, $f$, and the latter are on the insulating sections $c$.

The driving chain 22 for the trucks, engage with two toothed wheels 40, 41 (Fig. 6) arranged at opposite sides of the chain 22 and consequently rotated in opposite directions. The movement of the toothed wheels 40, 41 is transmitted by means of chain wheels 42, 43 and chains 44, 45 (Fig. 6), to chain wheels 46, 47 loosely mounted on the hollow spindle 34' of the switch gear S (Fig. 7) and carrying each one pawl 49 or 50. The pawls 49, 50 engage respectively with ratchet wheels 51, 52 secured to the hollow spindle 34'. During the movement I, the chain 22 rotates by means of the wheels 40, 42, chain 44, wheel 46, pawl 49 and ratchet wheel 51, the hollow spindle 34' together with the contacts $a^{I}-a^{IV}$, $b^{16}$, $b^{17}$, while the pawl 50 slides over the teeth of the ratchet wheel 52. The gear wheels are calculated in such a manner that at the moment when the trucks moving in the direction of the arrow I, reach their end position (Fig. 2), the contacts $a^{I}$ and $b^{16}$ leave the contact brushes $d$, $f$, and the latter arrive at the insulating fields $c$, whereby the motor 9 is stopped, and the clutch 16 thrown out of gear. In the same way, during the movement III, the contacts $a^{III}$ and $b^{16}$ are pulled away from the sliding brushes $d$, $f$.

The traverser 1 is provided at each side with a short tooth rack 53 or 54. These tooth racks 53, 54 are arranged at the end of the traverser (Fig. 6), and toward the end of the movements II and IV of the traverser 1, come into engagement with a toothed wheel 55 or 56. The toothed wheels 55, 56 are arranged at both sides of the changing compartment 2 and shifted relatively to each other, in the direction of movement of the traverser 1, to the amount of the movement of the latter (Fig. 6). The rotation of the toothed wheels 55, 56 is transmitted by means of chain wheels 56, 57 and chains 59, 60, to chain wheels 61, 62 mounted loose on the hollow spindle 34' of the switch gear S (Fig. 7) and carrying each a pawl 63 or 64. The pawls 63, 64 engage respectively with ratchet wheels 65, 66 secured to the hollow switch gear spindle 34'. Toward the end of the movement II of the traverser 1, its tooth rack 53 rotates, by means of the wheels 55, 57, chain 59, wheel 61, pawl 63 and ratchet wheel 65, the hollow spindle 34' together with the contacts $a^{I}-a^{IV}$, $b^{16}$, $b^{17}$, while the pawl 64 slides over the teeth of the ratchet wheel 66, and the handle 38 with the contact brushes $d$, $f$, remains standing still. Consequently the contacts $a^{II}$, $b^{17}$ are disengaged from the contact brushes $d$ $f$, and the latter brought to the next insulating fields $c$, whereby the motor 9 is stopped, and the clutch 17 thrown out of gear. In the same way, toward the end of the movement IV of the traverser 1, the contacts $a^{IV}$, $b^{17}$ are disengaged from the brushes $d$, $f$, by means of the tooth rack 54 and of the gear parts 58, 60, 62, 64, 66, 34'. Each following movement can be brought about by simply rotating the handle 38 to the next contacts.

In order to insure that at each movement of the traverser 1, the rotation of only one of the toothed wheels 55, 56 is transmitted to the switch gear S, the wheels 55, 56, as shown in Fig. 9, can be loosely mounted each on a short spindle 67, and drive, by means of a pawl 68, a ratchet wheel 69 secured to the spindle 67. The rotation of the spindle 67 is transmitted by means of a chain wheel 70 (Fig. 9) and chain 59 or 60, to the hollow spindle 34' of the switch gear S. The chain wheels 61, 62 can in that case be secured to the hollow switch gear spindle 34'.

The movement of the transverser 1, instead of being transmitted in the manner just described, could also be transmitted from the driving chain 24 for the traverser 1, as described in the transmission of movement of the trucks. Moreover, in place of the tooth racks 53, 54 and toothed wheels 55, 56, could be used drivers or cams of any desired shape.

Figure 13:
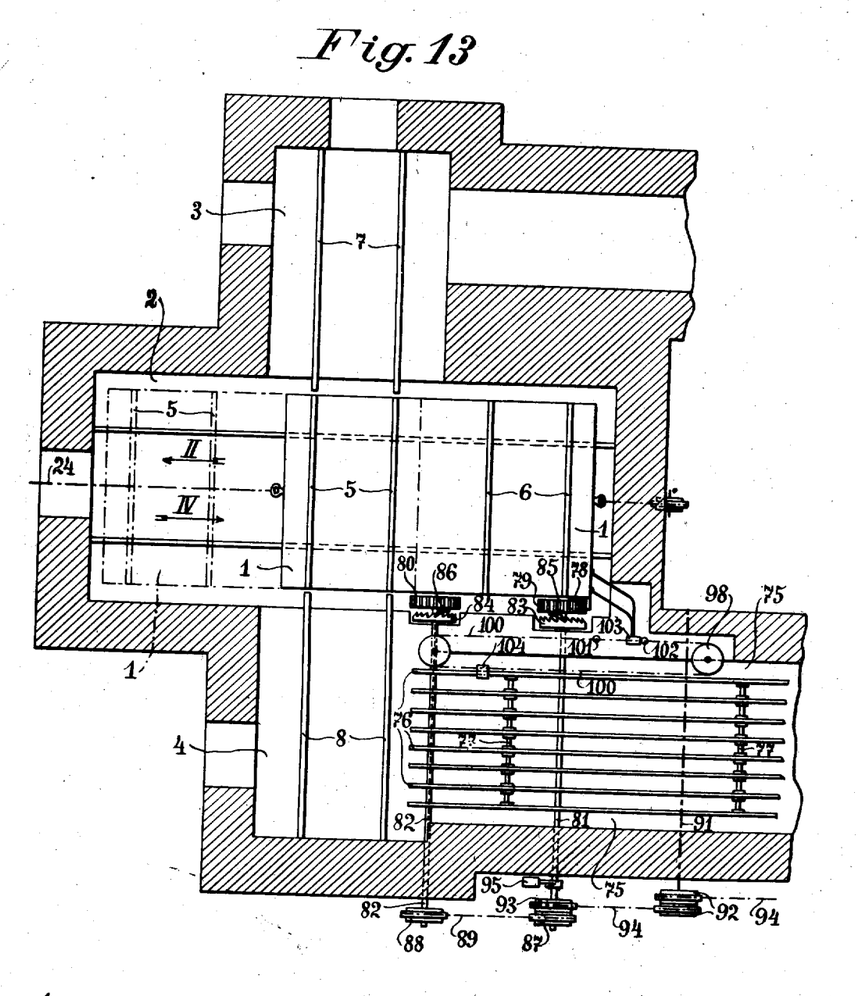
Figs. 13 and 13ᵃ show in plan the whole spreading oven, with some parts omitted, and more particularly the driving gear for the grid-conveyer.
Figure 13A:
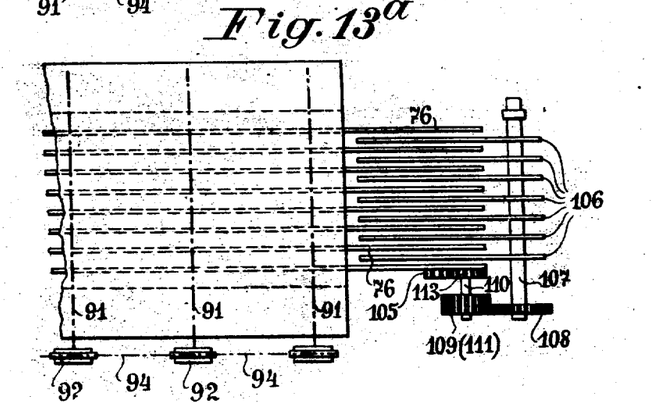
Figure 14:
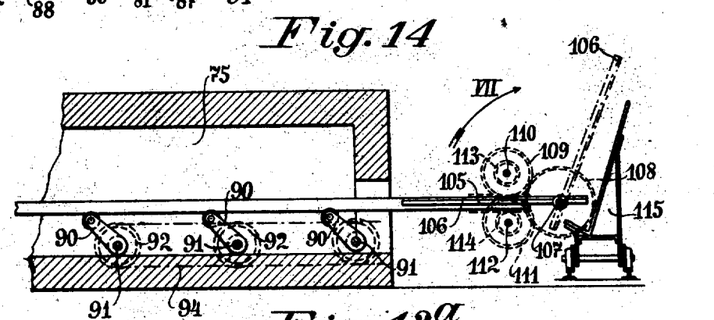
Fig. 14 shows in side elevation the end part of the conveyer, as well as the lifting off and laying-on device for the cooled sheets of glass.
Figure 15:
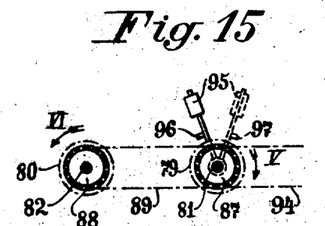
Fig. 15 shows another detail of the spreading oven.

An automatic stopping of the driving motor 9, as well as an automatic operation of the clutches 16, 17, and consequently a considerable simplification of the attendance of the spreading oven, are therefore obtained by means of the devices described. A further simplification of the attendance is insured according to this invention by the grid-conveyer and the lifting off and laying-on device for the cooled sheets of glass being automatically operated from the traverser 1. The devices used for the purpose are shown in Figs. 13 to 15. The traverser 1 is reciprocated, as described, in the direction of the arrows II and IV in the changing compartment 2 of the spreading oven. The movement in the direction of the arrow II takes place whenever a sheet of glass has been flattened in the spreading compartment 3, and the truck carrying the said sheet is to be brought into the changing compartment 2, and an empty truck from the changing compartment 2 into the spreading compartment 3. The movement of the traverser 1 in the direction of the arrow IV takes place when a sheet of glass has been trimmed in the trimming compartment 4, and introduced into the cooling tunnel 75 (Fig. 13), and the empty truck is to be brought from the trimming compartment 4 into the changing compartment 2 from which the truck carrying a sheet of glass that has been subjected to preliminary flattening, is to be brought into the trimming compartment 4. The trimmed sheet of glass is brought from the trimming compartment 4 on the bottom of the cooling tunnel 75 in which are arranged longitudinal bars 76 connected by cross-bars 77 to form a grate or grid (Fig. 13). The bars 76, 77 of the grid can engage with corresponding grooves in the bottom of the cooling tunnel, so that their upper faces are below the bottom of the cooling tunnel 75. The trimmed sheet of glass is at first situated on that portion of the cooling tunnel which adjoins the trimming compartment 4. In order to clear this portion of the cooling tunnel for the next trimmed glass sheet, the grid 76, 77 is raised, so that it raises the glass sheet, then pushed with its glass sheet away from the trimming compartment 4 and then lowered, whereupon the grid again deposits the glass sheet on the bottom of the cooling tunnel and then returns toward the trimming compartment 4. In that way, the glass sheets are intermittently conveyed to the end of the cooling tunnel 75. The described movements of the grid 76, 77 are derived, according to this invention, from the movement of the traverser 1. On the side of the traverser 1 is arranged a short tooth rack 78 (Fig. 13) which, when the traverser 1 is moved, engages consecutively with two toothed wheels 79, 80 mounted loose on the spindles 81, 82 arranged below the longitudinal bars 76 transversely of the same. To each of the said spindles 81, 82 is secured a ratchet wheel 83, 84, with the teeth of which engages a spring-controlled pawl 85 or 86 mounted on the corresponding one of the two toothed wheels 79, 80. The teeth of the ratchet wheel 83 are in the opposite direction to those of the ratchet wheel 84, so that when the traverser 1 moves in the direction of the arrow II, the tooth rack 78, by means of the toothed wheel 79 and the pawl 85, rotates the ratchet wheel 83 with the spindle 81 in the direction of the arrow V (Fig. 15), while toward the end of the movement of the traverser, the toothed wheel 80 is also rotated in the same direction, but leaves the ratchet wheel 84 with the spindle 82 standing still. On the spindles 81, 82 are further mounted chain wheels 87, 88. A chain 89 passing over the wheels 87, 88, transmits the movement of the spindle 81 to the spindle 82, and conversely. The levers 90 (Fig. 14) used for raising the longitudinal bars 76, are mounted in the well known manner on horizontal spindles 91, each of which is provided at its end with a chain wheel 92 (Fig. 13). The chain wheels 92 are connected together and to a chain wheel 93 mounted on the spindle 81, by means of chains 94. On the spindle 81 is further mounted a weighted lever 95, the movements of which to either side of the unstable equilibrium position, are limited by two fixed stops 96, 97 (Fig. 15). Between the cooling tunnel 75 and the traverser 1, over two horizontal rollers 98, 99 is passed a cable or a chain 100 provided at the portion facing the traverser 1, with two stops 101, 102, between which engages a driver 103 guided on the chain 100 and secured to the traverser 1. The other portion of the chain 100 is connected by means of a part 104 to the longitudinal bars 76. When the traverser 1 is moved from the position shown in full lines in Fig. 13, in the direction of the arrow II, the spindle 81 with the weighted lever 95 will be turned, in the manner indicated, in the direction of the arrow V (Fig. 15), and the weighted lever 95 will pass through its position of unstable equilibrium and fall into the position shown by chain-dotted lines in Fig. 15, in which it rests on the stop 97. At the same time, the spindles 91 with the levers 90 will be turned in the same direction, whereby the grid 76, 77 will be raised. As long as the tooth rack 89 remains in engagement with the toothed wheel 79, the driver 103 will move from the stop 102 to the stop 101 without affecting the chain 100. At the moment when the tooth rack 78 releases the toothed wheel 79, the driver 103 has reached the stop 101, and during continued movement of the traverser 1, will drive the chain 100 which, by means of the above mentioned connection 104, will move the raised grid 76, 77 away from the trimming compartment 4 (arrow IV). The weighted lever 95 which is in the chain-dotted position (Fig. 15), keeps the grid 76, 77 in the raised position during its movement. Toward the ends of the movement of the traverser 1, its tooth rack 78 engages with the toothed wheel 80 and rotates the latter in the same direction as it did previously the wheel 79. This rotation of the wheel 80 is however not transmitted to the ratchet wheel 84 and to the spindle 82, as during this rotation of the toothed wheel 80, the pawl 86 slides over the teeth of the ratchet wheel 84. When the traverser 1 is pushed back from the chain-dotted position in the direction of the arrow IV, the tooth rack 78 will rotate the toothed wheel 80 in the direction of the arrow VI (Fig. 15), which rotation is transmitted by the pawl 86 to the ratchet wheel 84 and the spindle 82, by the chain 89 to the spindle 81 and the weighted lever 95, as well as by the chains 94 to the spindles 91 and the levers 90. In that way, the weighted lever 95 is brought back to the position shown in full lines in Fig. 15, and the grid 76, 77 is lowered and drawn in the said lowered position by the driver 103, by means of the stop 102 and the chain 100, toward the trimming compartment 4 (arrow II).

For lifting out the glass sheets from the cooling tunnel, when they reach the end of the latter, and for laying the glass sheets on the truck, there is provided, according to this invention, at the end of the tunnel, a device which is automatically operated by the traverser by means of the longitudinal bars 76. One of the outer longitudinal bars 76 is provided at the end with a tooth rack 105 with teeth at the top and at the bottom, used for operating the lifting off device. The latter consists of grate-shaped bars 106 secured to a spindle 107 and engaging between the longitudinal bars 76. The spindle 107 carries a toothed wheel 108 with which engages a toothed wheel 109 mounted on a short spindle 110 arranged above the grate 76, 77, and engaging with a toothed wheel 111 mounted on a spindle 112 (Fig. 14) arranged below the grate. On the spindle 110 is mounted a small toothed wheel 113, and on the spindle 112 a toothed wheel 114 of the same size. When the grid 76, 77 is raised, the tooth rack 105 engages with the toothed wheel 113, and when the grid is lowered, the tooth rack 105 engages with the toothed wheel 114. As soon as the raised grid 76, 77 is moved away from the trimming compartment 4 (arrow IV), the rotation takes place in the direction of the arrow VII (Fig. 14), owing to the upper teeth of the rack 105 and to the toothed wheels 113 and 109, toothed wheel 109 and bars 106. The bars 106 lift off the glass sheet lying on the ends of the grid 76, 77 and place it on the truck 115 which is next to the lifting off device. Owing to the movement of the lowered grid toward the trimming compartment, the lower teeth of the rack 105 and the toothed wheels 114, 111, 109 and 108 turn the bars 106 back to the position shown in full lines. It will be understood that the glass plate, which is to be lifted from the grid, has been moved to the rear or discharge end of the cooling tunnel, as above described. When the grid is raised this sheet of glass will rest on the rear end of the grid and when the latter is moved, in the direction of arrow IV, after being raised, the rear end of the grid with the glass sheet thereon is carried over the grate 106 before the rack 105 engages with the toothed wheel 113.

The described devices for automatic operation of the grate conveyer and of the lifting off and laying-on device, for the cooled glass sheets could also be used in spreading ovens, the traversers of which are operated by hand.

I claim:

1. A spreading oven for the manufacture of sheet glass, comprising a plurality of spreading trucks movable therein in four directions, mechanism for effecting said movements, and means operated by the movement of said trucks to automatically stop the moving mechanism.

2. A spreading oven for the manufacture of sheet glass, comprising a plurality of trucks movable therein in opposite directions, a traverser to move the trucks transversely, mechanism for imparting said movements to the trucks, mechanism to move the traverser, and mechanisms operated by the movements of the trucks and traverser to automatically stop said moving mechanisms.

3. A spreading oven for the manufacture of sheet glass, comprising a plurality of compartments, a plurality of spreading trucks in the oven, mechanism for moving said trucks in sequence into said compartments, a cooling tunnel communicating with the oven, and means in the tunnel operated by said truck moving mechanism to convey the sheets of glass along said tunnel.

4. In a spreading oven for the manufacture of sheet glass, comprising a plurality of compartments, a plurality of spreading trucks in the oven, mechanism for moving said trucks in sequence into said compartments, said means including a traverser, a cooling tunnel communicating with the oven, and means in the tunnel operated by the movements of the traverser to convey the sheets of glass along said tunnel.

5. In a spreading oven for the manufacture of sheet glass, comprising a plurality of compartments, a plurality of spreading trucks in the oven, mechanism for moving said trucks in sequence into said compartments, said means including a traverser, a cooling tunnel communicating with the oven, a grid in the tunnel for conveying the sheets of glass along the latter and mechanism operated by the movement of the traverser for actuating the grid.

6. In a spreading oven for the manufacture of sheet glass, comprising a plurality of compartments, a plurality of spreading trucks in the oven, mechanism for moving said trucks in sequence into said compartments, said means including a traverser, a cooling tunnel communicating with the oven, a grid in the tunnel for conveying the sheet of glass along the latter, mechanism operated by the movement of the traverser for actuating the grid, and means operated by the grid for automatically lifting the sheets of glass from the latter.

7. A spreading oven for the manufacture of sheet glass, comprising a plurality of compartments, spreading trucks in the oven, mechanism including a motor for moving said trucks in sequence into said compartments, a switch-gear controlling the motor, and mechanism operated by the movement of the trucks to automatically stop the motor.

8. A spreading oven for the manufacture of sheet glass, comprising a plurality of compartments, spreading trucks movable in sequence into said compartments, an electric motor, driving gear connecting the motor with the trucks, electric clutches included in the gear, an electric switch for operating the clutches, and means operated by the movements of the trucks for actuating the switch to automatically stop the motor and disconnect the clutches.

9. A spreading oven for the manufacture of sheet glass, comprising a plurality of compartments, spreading trucks in the oven, driving gear for moving the trucks in opposite directions, a traverser for moving the trucks transversely in opposite directions, driving gear for moving the traverser, an electric motor for operating said driving gear, clutches connecting the motor with the driving gear, a switch gear for controlling the operation of the motor, and means operated by the movements of the trucks and traverser for automatically operating the switch to stop the motor and disconnect the clutches.

10. In a spreading oven for the manufacture of sheet glass, a traverser movable therein in opposite directions, trucks movable with and transversely to the traverser, independently operable gearing for moving the traverser and trucks, an electric motor, clutches connecting the gearing to the motor, a switch gear electrically connected with the motor and provided with contacts corresponding to the number of different movements of the traverser and trucks, and arranged to impart successively a movement to the trucks in one direction and a transverse movement to the traverser, movable contacts coöperating with the aforesaid contacts, and means operated at the end of the movements of the trucks and traverser for automatically breaking the contacts to stop the motor.

11. In a spreading oven for the manufacture of sheet glass, a traverser movable therein in opposite directions, trucks movable with and transversely to the traverser, independently operable gearing for moving the traverser and trucks, an electric motor, clutches connecting the gearing to the motor, a switch gear electrically connected with the motor and provided with contacts corresponding to the number of different movements of the traverser and trucks, and arranged to impart successively a movement to the trucks in one direction and a transverse movement to the traverser, movable contacts coöperating with the aforesaid contacts, and means operated by the movements of the trucks and traverser to move the contacts of the switch gear out of contact with the coöperating contacts.

12. In a spreading oven for the manufacture of sheet glass, a traverser movable therein in opposite directions, trucks movable with and transversely to the traverser, independently operable gearing for moving the traverser and trucks, an electric motor, clutches connecting the gearing to the motor, a switch gear electrically connected with the motor and provided with contacts corresponding to the number of different movements of the traverser and trucks and arranged to impart successively a movement to the trucks in one direction and a transverse movement to the traverser, movable contacts coöperating with the aforesaid contacts, and means operated by the movements of the trucks and traverser to rotate the switch gear to move its contacts out of engagement of the coöperating contacts.

13. A spreading oven for the manufacture of sheet glass, comprising a plurality of compartments, spreading trucks movable in sequence into said compartments, driving gear for moving said trucks, a traverser for shifting the latter, driving gear for moving the traverser, an electric motor, clutches connecting the motor to the driving gear of the trucks and traverser, a switch gear electrically connected with the motor, having contacts for effecting the reversing of the motor and contacts for effecting the operation of the clutches.

14. The combination with a spreading oven for the manufacture of sheet glass, a reciprocating traverser therein, and a cooling tunnel connected with the oven, of a grid in the tunnel, means operated by the movements of the traverser to raise and lower the grid, and means operated by the movements of the traverser to reciprocate the grid.

15. The combination with a spreading oven for the manufacture of sheet glass, a reciprocating traverser therein, and a cooling tunnel connected with the oven, of a grid in the tunnel, means operated by the movements of the traverser to raise and lower the grid, means operated by the movements of the traverser to reciprocate the grid, and mechanism at the end of the tunnel operated by the reciprocations of the grid for removing sheets of glass from the latter.

16. The combination with a spreading oven for the manufacture of sheet glass, a reciprocating traverser therein, and a cooling tunnel connected with the oven, of a grid in the tunnel, a series of pivoted levers adapted to raise and lower the grid, rotatable spindles connected with the levers, and means on the spindles and traverser for alternately rotating the spindles to oscillate the levers.

17. In a spreading oven, the combination with a reciprocating traverser movable in the oven, a cooling tunnel connected with the latter, of a grid in the tunnel comprising a series of longitudinal bars, a plurality of pivoted levers to support the latter, two spindles connected with the levers, and means on the spindle operable by the traverser to alternately rotate the spindles to raise and lower the levers.

18. In a spreading oven, the combination with a reciprocating traverser movable in the oven, a cooling tunnel connected with the latter, of a grid in the tunnel comprising a series of longitudinal bars, a plurality of pivoted levers to support the latter, two spindles connected with the levers, means on the spindles operable by the traverser to alternately rotate the spindles to raise and lower the lever, and means operated by the movements of the traverser to reciprocate the grid.

19. In a spreading oven, the combination with a reciprocating traverser movable in the oven, a cooling tunnel connected with the latter, of a grid in the tunnel comprising a series of longitudinal bars, two driving spindles and lifting spindles mounted transversely of the bars, drive chains connecting said spindles, levers on the lifting spindles adapted to engage the bars, gears on the driving spindles, a rack on the traverser adapted to engage the gears, and pawl and ratchet mechanisms on the driving spindles adapted to alternately rotate the latter.

20. In a spreading oven, the combination with the reciprocating traverser movable in the oven, a cooling tunnel connected with the latter, of a grid in the tunnel comprising a series of longitudinal bars, two driving spindles and lifting spindles mounted transversely of the bars, drive chains connecting said spindles, levers on the lifting spindles adapted to engage the bars, gears on the driving spindles, a rack on the traverser adapted to engage the gears, pawl and ratchet mechanisms on the driving spindles adapted to alternately rotate the latter, and a weighted lever on one of the driving spindles adapted to maintain the grid in a raised or lowered position.

21. In a spreading oven, the combination with a reciprocating traverser movable in the oven, a cooling tunnel connected with the latter, of a grid in the tunnel comprising a series of longitudinal bars, two driving spindles and lifting spindles mounted transversely of the bars, drive chains connecting said spindles, levers on the lifting spindles adapted to engage the bars, gears on the driving spindles, a rack on the traverser adapted to engage the gears, pawl and ratchet mechanisms on the driving spindles adapted to alternately rotate the latter, an endless chain connected with the grid, and means connecting the chain to the traverser adapted to reciprocate the grid when the latter has been raised and lowered.

In testimony that I claim the foregoing as my invention, I have signed my name in presence of two subscribing witnesses.

FRITZ HELLER.

Witnesses:
ALOIS CHMELIK,
ADOLPH FISCHER.